3,267,270
APPARATUS FOR DETERMINING THE TRUE HEIGHT OF AN OBJECT ABOVE THE EARTH'S SURFACE

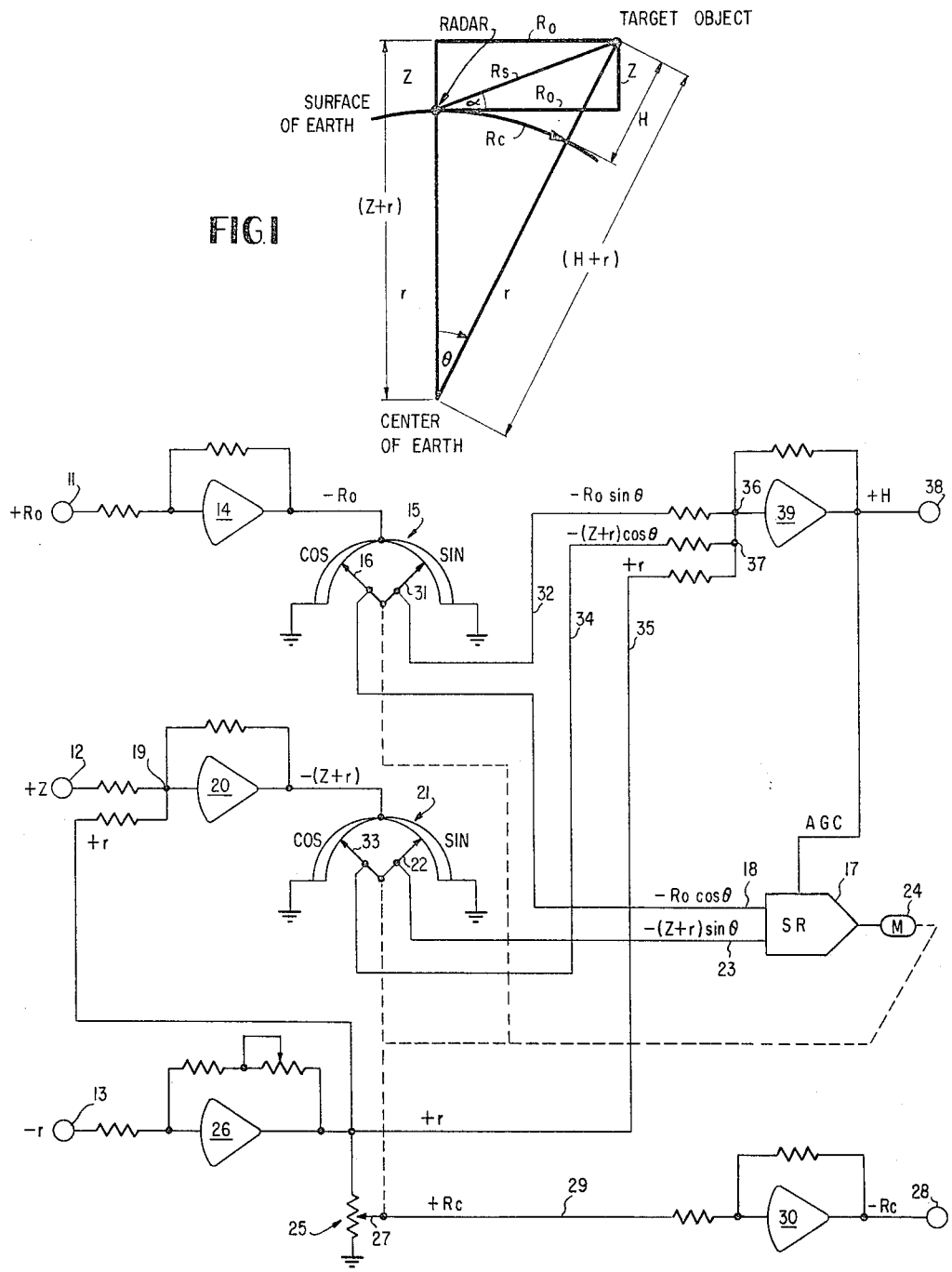

Thomas Z. Smidowicz, West Long Branch, N.J., assignor to Electronic Associates Inc., Long Branch, N.J., a corporation of New Jersey
Filed Jan. 16, 1963, Ser. No. 251,967
4 Claims. (Cl. 235—186)

This invention relates in general to a method and apparatus for analog computation and more particularly to a novel method and apparatus for determining the true height and horizontal range of a distant object above the earth's surface.

As radar technology has advanced over the years, especially in keeping pace with the present day requirements of long range missile, high altitude manned aircraft, and space satellite detection and tracking, the maximum ranges at which radar equipments are effectively operable has correspondingly increased. When Cartesian target coordinates (horizontal range and height) are supplied by a long range radar for a target object several hundred miles or more distant travelling above the earth's surface, earth curvature corrections must be provided in order to achieve the required degree of accuracy. When dealing with shorter radar ranges, the conventional manner of obtaining such corrections has been to employ geometrical series expansions, utilizing only the first several terms of the expansions as a close approximation in arriving at the true coordinates. While this technique has proved to be satisfactory for short range targets, its extension to long range targets requires the utilization of additional terms of the expansions which becomes not only awkward but wholly impractical in terms of both design and apparatus requirements. As an illustrative example of the shortcomings of the expansion method, for an angle $\theta$ at the center of the earth between a ground based radar and a target object of 55 degrees, a radar with a maximum range of 10,000,000 yards employing two correction terms of the expansion in height plus three correction terms of the expansion in range will produce 4 percent errors in corrected height and 1 percent errors in corrected range. Two additional correction terms in each expansion are required to reduce these errors to slightly greater than 0.1 percent.

It is accordingly an object of this invention to provide a novel method and apparatus for computing earth curvature corrections for the horizontal range and height of a distant target object as sensed by a long range radar.

It is a further object of this invention to provide such a method and apparatus which is capable of supplying exact corrections of this type with greater accuracy and which requires less implementing equipment than previously employed techniques.

It is a further object of this invention to provide a novel D.-C. analog computer employing conventional components which, when supplied with uncorrected horizontal range and height coordinates of a distant object by a long range radar, will quickly and accurately apply true earth curvature corrections thereto and provide such corrected coordinates at its output terminals.

These and further objects of this invention will be readily apparent to those skilled in the art from a consideration of the following description of the best embodiment thereof yet contemplated, taken in conjunction with the drawings in which:

FIGURE 1 is a geometrical diagram which will be used for purposes of illustration showing the locations of the center of the earth, a ground based radar, and a distant target object, and identifying certain essential linear and angular dimensions, and FIGURE 2 is a schematic diagram of a novel analog computer circuit which is capable of providing exact earth curvature corrections for the horizontal range and height of a distant target object as sensed by a long range radar.

Referring now to FIGURE 1, a radar station positioned on the earth's surface as shown transmits a series of spaced pulse signals from a directional antenna which are reflected off of or bounced back from a distant target object above the earth's surface. The reflected pulse signals are detected and received by the radar antenna and the slant range $Rs$ and the elevation angle $\alpha$ are obtained. The slant range $Rs$ is derived from the elapsed time between the transmission, reflection, and receipt of a given pulse, and the elevation angle $\alpha$ is obtained from the angular position of the directional radar antenna. A conventional polar-to-Cartesian coordinate computer supplies the uncorrected horizontal range $Ro$ and height $Z$, which are trigonometrically derived from $Rs$ and $\alpha$ in accordance with the following equations:

$$Z = Rs \sin \alpha, \tag{1}$$

and $$Ro = Rs \cos \alpha \tag{2}$$

These two quantities $Ro$ and $Z$, along with the known radius of the earth $r$, serve as the basic data inputs to the earth curvature correction analog computer shown in FIGURE 2.

For the derivation of the expressions for the corrected horizontal range $Rc$ and the corrected height $H$, and the computational implementation thereof, reference is again made to FIGURES 1 and 2, from which it can be seen that, $$\tan \theta = \frac{Ro}{Z+r} \tag{3}$$

and since $$\tan \theta = \frac{\sin \theta}{\cos \theta}$$

substituting and cross-multiplying yields, $$\frac{\sin \theta}{\cos \theta} = \frac{Ro}{Z+r} \tag{4}$$

or $$(Z+r) \sin \theta = Ro \cos \theta \tag{5}$$

In order to implement the balanced relationship defined by Equation 5 to arrive at a continuing solution for the unknown angle $\theta$, D.-C. voltages representing the known quantities $Ro$, $Z$, and $r$, and having the polarities shown, are applied to input terminals 11 and 13, respectively. The positive polarity of $Ro$ is reversed by operational amplifier 14, the output of which is applied across the respective halves of a sine-cosine wound potentiometer 15.

Operational amplifier 14, potentiometer 15, and the rest of the circuit components shown in FIGURE 2 may take any one of several acceptable forms, all of which are well known and conventional in the analog computing art. Since the specific form of these components is outside the scope of the present invention, they will not be described in detail. For a more precise explanation of the design and functioning of these components, reference is made to the authoritative textbook on the subject entitled, "Electronic Analog Computers" by Granino A. Korn and Theresa M. Korn, published in 1956 by the McGraw-Hill Book Company, Inc., Library of Congress catalog card number 56–8176.

Wiper arm 16 of potentiometer 15 contacts the cosine winding thereof, and, assuming for the present that wiper arm 16 is positioned in accordance with the value of the angle $\theta$, the product $-Ro \cos \theta$ is taken therefrom and supplied as the first input to servo-resolver 17 over connecting line 18. It will be noted that the quantity $Ro \cos \theta$ represents the right hand side of Equation 5.

The voltages representing the uncorrected height Z and the radius of the earth $r$ are additively combined at terminal 19 and their sum $Z+r$ is applied to operational amplifier 20. The polarity reversed output of amplifier 20 is in turn applied across the respective halves of sine-cosine wound potentiometer 21 in the same manner as the $-Ro$ voltage was applied across similar potentionmeter 15. The output of the sine wiper arm 22 of potentiometer 21, again assumed to be positioned in accordance with the value of the angle $\theta$, represents a multiplication of the applied voltage $-(Z+r)$ and the sine of the positioning angle $\theta$, and this product $-(Z+r) \sin \theta$ is supplied as the second input to servo-resolver 17 over connecting line 23. The quantity $-(Z+r) \sin \theta$ will be recognized as representing the left hand side of Equation 5.

Servo-resolver 17 effects a comparison of the two applied input quantities and in accordance with the balanced relationship defined by Equation 5 produces an output voltage which is directly proportional to the unknown angle $\theta$. This voltage is applied to a reversible motor 24, which in servo-loop fashion, drives the ganged wiper arms of sine-cosine potentiometers 15 and 21 and linear potentiometer 25 to a null position representative of the value of the angle $\theta$ at the center of the earth between the ground-based radar and the distant target object detected by it.

Proceding now to an exact solution for the earth curvature corrected horizontal range $Rc$, it is seen from FIGURE 1 that, for $\theta$ small, $$\theta = \frac{Rc}{r}$$

or, transposing, $$Rc = r\theta \quad (6)$$

The earth's radius $r$ is a known quantity, and, as previously described, is applied as a reference voltage input to terminal 13. Its polarity is reversed by operational amplifier 26 and the output therefrom is applied across linear potentiometer 25. The output taken from wiper arm 27 of potentiometer 25 represents a multiplication of the applied voltage $r$ and the positioning angle $\theta$, and this product $r\theta$, which is recognized as the desired earth curvature corrected horizontal range $Rc$ as defined by Equation 6, is supplied to output terminal 28 via connecting line 29 and polarity reversing operational amplifier 30.

Thus, by means of the novel analog implementation of several relatively uncomplicated and straightforward geometric and trigonometric derivations, an output voltage may be obtained from the apparatus of FIGURE 2 which represents the exact horizontal radar range of a distant target object accurately corrected for the curvature of the earth's surface.

Referring once again to FIGURE 1, the expression for the corrected height H is derived by applying the Pythagorean Theorem for the sum of the squares of the sides of a right triangle as follows:

$$(r+H)^2 = Ro^2 + (r+Z)^2 \quad (7)$$

noting that H is the only unknown quantity in Equation 7. Dividing both side of Equation 7 by $r+H$ yields, $$r+H = \frac{Ro^2}{r+H} + \frac{(r+Z)^2}{r+H} \quad (8)$$

and transposing $r$ we have, $$H = \frac{Ro^2}{r+H} + \frac{(r+Z)^2}{r+H} - r \quad (9)$$

Since however, $$\sin \theta = \frac{Ro}{r+H} \quad (10)$$

and, $$\cos \theta = \frac{r+Z}{r+H} \quad (11)$$

we can substitute Equations 10 and 11 in Equation 9, which gives us, $$H = Ro \sin \theta + (r+Z) \cos \theta - r \quad (12)$$

which is the exact expression for the earth curvature corrected height H of the target object.

In order to implement the desired solution for H as defined by Equation 12, reference is again made to the schematic diagram of FIGURE 2. Since a $-Ro$ voltage is applied across potentiometer 15, the wiper arms of which are positioned in accordance with the value of the angle $\theta$ as previously described, the product $-Ro \sin \theta$ is taken directly from sine wiper arm 31 and applied to connecting line 32. The quantity $Ro \sin \theta$ is recognized as being the first term in Equation 12. In a similar manner, the product $-(Z+r) \cos \theta$, which is the second term in Equation 12, is available at the cosine wiper arm 33 of potentiometer 21 which is connected to line 34. The third and last term of Equation 12, the radius of the earth $r$, is available as one of the original inputs and is taken from the output of operational amplifier 26 over line 35. These three quantity voltages on lines 32, 34 and 35 are additively combined at terminals 36 and 37, and their sum, which represents the desired corrected target object height H as defined by Equation 12 is supplied to output terminal 38 via polarity reversing operational amplifier 39.

Thus, a novel method and appartus for analog computation has been described which may be advantageously used to determine the earth curvature corrected horizontal range and height of a distant target object above the earth's surface as sensed by a long range radar. The apparatus is characterized by its relative structural simplicity and produces highly accurate results when supplied with reliable input data, which is readily available from conventional long range radar equipment.

While there has been described above a particular embodiment of the present invention, various minor modifications and changes therein will be apparent to those skilled in the analog computer art. Since the disclosed embodiment is intended to be illustrative only and not in any way limiting, such modifications and changes are deemed to be within the spirit and scope of the present invention, which is limited only as defined in the following claims.

I claim:

1. An apparatus for determining the earth curvature corrected horizontal range $Rc$ and height H of a target object above the earth's surface as sensed by a ground-based radar which supplies the uncorrected horizontal range $Ro$ and height Z of the target object, assuming the radius of the earth $r$ to be known, comprising:
   (a) means for multiplying the quantity $Ro$ by the cosine of the angle $\theta$ at the center of the earth between the radar and the target object,
   (b) means for multiplying the quantity $Ro$ by the sine of the angle $\theta$,
   (c) means for adding the quantities Z and $r$,
   (d) means for multiplying the quantity $(Z+r)$ by the sine of the angle $\theta$,
   (e) means for multiplying the quantity $(Z+r)$ by the cosine of the angle $\theta$,
   (f) means for comparing the magnitudes of the products $Ro$ cosine $\theta$ and $(Z+r)$ sine $\theta$,
   (g) means for deriving the value of the angle $\theta$, sine $\theta$ and cosine $\theta$ from the comparison effected by the means recited in sub-paragraph (f) in accordance with the expression $Ro$ cosine $\theta = (Z+r)$ sine $\theta$,
   (h) means for supplying the value of sine $\theta$ and cosine $\theta$ derived by the means recited in sub-paragraph (g) to the multiplying means recited in sub-paragraphs (a), (b), (d), and (e) in servo-loop fashion,
   (i) means for multiplying $\theta$ by $r$ to obtain the earth curvature corrected horizontal range $Rc$ in accordance with the expression $Rc = r\theta$, (j) means for adding the products $Ro$ sine $\theta$ and $(Z+r)$ cosine $\theta$, and (k) means for subtracting $r$ from the sum obtained from the adding means recited in step (j) to obtain the earth curvature corrected height H in accordance with the expression $H=Ro$ sine $\theta+(Z+r)$ cosine $\theta-r$.

2. An apparatus for determining the earth curvature corrected horizontal range $Rc$ of a target object above the earth's surface as sensed by a ground-based radar which supplies the uncorrected horizontal range $Ro$ and height Z of the target object, assuming the radius of the earth $r$ to be known, comprising:

(a) means for multiplying the quantity $Ro$ by the cosine of the angle $\theta$ at the center of the earth between the radar and the target object, (b) means for adding the quantities Z and $r$, (c) means for multiplying the quantity $(Z+r)$ by the sine of the angle $\theta$, (d) means for comparing the magnitudes of the products $Ro$ cosine $\theta$ and $(Z+r)$ sine $\theta$, (e) means for deriving the value of the angle $\theta$, sine $\theta$ and cosine $\theta$ from the comparison effected by the means recited in sub-paragraph (d) in accordance with the expression $Ro$ cosine $\theta=(Z+r)$ sine $\theta$, (f) means for supplying the value of sine $\theta$ and cosine $\theta$ derived by the means recited in sub-paragraph (e) to the multiplying means recited in sub-paragraphs (a) and (c) in servo-loop fashion, and (g) means for multiplying $\theta$ by $r$ to obtain the earth curvature corrected horizontal range $Rc$ in accordance with the expression $Rc=r\theta$.

3. An apparatus for determining the earth curvature corrected height H of a target object above the earth's surface as sensed by a ground-based radar which supplies the uncorrected horizontal range $Ro$ and height Z of the target object, assuming the radius of the earth $r$ to be known, comprising:

(a) means for determining the value of the angle $\theta$, sine $\theta$ and cosine $\theta$, $\theta$ being the angle at the center of the earth between the radar and the target object, in accordance with the expression $Ro$ cosine $\theta=(Z+r)$ sine $\theta$, (b) means for multiplying the quantity $Ro$ by the sine of the angle $\theta$, (c) means for multiplying the quantity $(Z+r)$ by cosine of the angle $\theta$, (d) means for adding the products $Ro$ sine $\theta$ and $(Z+r)$ cosine $\theta$, and (e) means for subtracting $r$ from the sum obtained from the adding means recited in sub-paragraph (d) to obtain the earth curvature corrected height H in cordance with the expression $H=Ro$ sine $\theta+(Z+r)$ cosine $\theta-r$.

4. An apparatus for determining the earth curvature corrected horizontal range $Rc$ and height H of a target object above the earth's surface as sensed by a ground-based radar which supplies the uncorrected horizontal range $Ro$ and height Z of the target object, assuming the radius of the earth $r$ to be known, comprising:

(a) means for determining the value of the angle $\theta$, sine $\theta$ and cosine $\theta$, $\theta$ being the angle at the center of the earth between the radar and the target object, in accordance with the expression $Ro$ cosine $\theta=(Z+r)$ sine $\theta$, (b) means for multiplying $r$ by $\theta$ to obtain the earth curvature corrected horizontal range $Rc$ in accordance with the expression $Rc=r\theta$, (c) means for multiplying the quantity $Ro$ by the sine of the angle $\theta$, (d) means for adding the quantities Z and $r$, (e) means for multiplying the quantity $(Z+r)$ by the cosine of the angle $\theta$, (f) means for adding the products $Ro$ sine $\theta$ and $(Z+r)$ cosine $\theta$, and (g) means for subtracting $r$ from the sum obtained from the adding means recited in sub-paragraph (f) to obtain the earth curvature corrected height H in accordance with the expression $$H=Ro \text{ sine } \theta+(Z+r) \text{ cosine } \theta-r.$$

References Cited by the Examiner
UNITED STATES PATENTS

| | | | |
|---|---|---|---|
| 2,993,644 | 7/1961 | Resnick | 235—186 |
| 2,996,251 | 8/1961 | Hunt | 235—61.5 |
| 3,017,105 | 1/1962 | Alstyne et al. | 235—186 |
| 3,031,657 | 4/1962 | Trunk | 343—5 |
| 3,069,677 | 12/1962 | Bruck et al. | 343—11 |

MALCOLM A. MORRISON, *Primary Examiner.*

I. KESCHNER, *Assistant Examiner.*